United States Patent
Siebring

(10) Patent No.: US 7,295,666 B2
(45) Date of Patent: Nov. 13, 2007

(54) QUERY AND ANALYSIS METHOD FOR MSTPS IN A MOBILE TELECOMMUNICATION NETWORK

(75) Inventor: Willem Albert Siebring, Gouda (NL)

(73) Assignee: Koninklijke KPN N.V. (NL)

( * ) Notice: Subject to any disclaimer, the term of this patent is extended or adjusted under 35 U.S.C. 154(b) by 309 days.

(21) Appl. No.: 10/183,203

(22) Filed: Jun. 27, 2002

(65) Prior Publication Data

US 2003/0012211 A1     Jan. 16, 2003

(30) Foreign Application Priority Data

Jul. 6, 2001     (EP)     ................... 01202605

(51) Int. Cl.
*H04M 7/00*     (2006.01)
(52) U.S. Cl. ................ 379/221.1; 379/221.13
(58) Field of Classification Search ........... 379/221.13, 379/221.1, 207.2, 219, 221.08
See application file for complete search history.

(56) References Cited

U.S. PATENT DOCUMENTS

| | | | |
|---|---|---|---|
| 5,787,253 A | 7/1998 | McCreery et al. ..... | 395/200.61 |
| 5,799,317 A | 8/1998 | He et al. ..................... | 707/104 |
| 5,802,145 A | 9/1998 | Farris et al. .................. | 379/34 |
| 6,269,396 B1 * | 7/2001 | Shah et al. .................. | 709/223 |
| 6,549,620 B2 * | 4/2003 | Hao ....................... | 379/221.13 |

OTHER PUBLICATIONS

Dengi, C. and Neftçi, S., "Dflow Workflow Management System," IEEE, 1997, pp. 16-21.

* cited by examiner

*Primary Examiner*—William J. Deane, Jr.
(74) *Attorney, Agent, or Firm*—McDonnell Boehnen Hulbert & Berghoff LLP

(57) ABSTRACT

The present invention is related to a method for analysing the functions of a signal transfer point in a telecommunications network, said method comprising:
Regularly collecting all IPR messages from said signal transfer point and store said messages as a raw data file in a memory,
Storing the data present in said IPR messages in a context-linked database, and
Creating a report based on data present in said IPR messages by querying said context-linked database.

16 Claims, 2 Drawing Sheets

QUERY AND ANALYSIS METHOD FOR MSTPS IN A MOBILE TELECOMMUNICATION NETWORK

FIELD OF THE INVENTION

The present invention is related to a method for querying signal transfer points in a mobile telecommunication network.

STATE OF THE ART

Common-channel signalling networks use so-called signal transfer points (STPs) for providing the transfer of signalling messages from one signalling link to another. Usually, a mobile telecommunication network comprises base stations that are responsible for the link with the users of the network. These base stations are connected to a local mobile switching centre (MSC). These MSCs are interconnected with STPs, and assure inter-GSM communications on the same network. For communications towards other networks such as normal telephone networks, the MSCs are connected to a GMSC (Gateway MSC).

Such a network architecture is used for any system that supports the SS7 signalling system.

It is clear that all these elements are required for the network to provide its services and that it is crucial for the telecom operator to limit down-time of any of these elements to the strictest minimum.

STPs normally operate without external intervention, but do create IPRs (Information and Problem Reports) that can be accessed via an administration network. These IPRs can contain alarms that are non-critical (i.e. alarms signalling events that do not hinder normal operation of the STP) but also critical alarms, which report events that have or will stop or seriously hinder normal STP operation.

Normal procedure in case of an STP crash is to verify the IPRs emitted by said STP and analyse them. However, the state of the art interfaces only allow a full download of all IPRS. Some errors only create malfunction after several days, and analysis of such a malfunction requires thus downloading of several days of IPRs. Such a download can take as much as 24 hours, thereby extending the downtime of the STP significantly. Also, IPRs can be difficult to interpret, resulting in time-consuming analysis of said IPRs in case of an STP crash. Quickly distinguishing critical and non-critical alarms is crucial in such a case to keep the down-time minimal.

Also, these IPRs are usually discarded with relatively quickly to avoid memory overloads. Usually, a history of only a few days is kept in memory, which makes it impossible to make a long-term analysis of network functioning.

AIMS OF THE INVENTION

The present invention aims to provide a method for administering STPs quickly and efficiently as to keep possible down-time minimal. Further, the present invention aims to provide tools for quick short- and long term analysis of STP and overall network functioning.

SUMMARY OF THE INVENTION

The present invention concerns a method for analysing the functions of a signal transfer point in a telecommunications network, said method comprising:
Collecting IPR messages from said signal transfer point,
Storing the data present in said IPR messages in a context-linked database, and optionally
Creating a report based on data present in said IPR messages by querying said context-linked database.

Querying said context-linked database is far more efficient than the methods known in the art. IPR analysis can thus be done in a more efficient and less time consuming way.

Preferably, said step of collecting IPR messages is performed regularly. Preferably, said method further comprises validation of said IPR messages before storage in the context-linked database, only validated IPR messages being stored. Validation can e.g. be done by analysing standard data present in each IPR, such as date, time or sequence number.

Further, storage in said context-linked database preferably comprises the following steps:
Selecting data from an IPR message regarding the functioning of the signal transfer point, and
Storing said data in the context-linked database in an appropriate place.

This means that an IPR will be divided into all its parts, in other words every part of the IPR message that is in itself significant, will be stored in a specific place in the context-based database. This results in a database that can easily be queried for any kind of information relating to the STP Said reports can comprise any information that can be useful for administration of the network. For example, the alarm messages by the signal transfer point can be stored, but other information such as STP-specific information (processor restarts, user logins, IPR summary, alarm summary, . . . ) or network information (availability of services and/or links, other failures, . . . ).

Another aspect of the present invention is a method for long-term analysis of the functioning of a telecommunication network comprising STPs, said method comprising:
Creating a context linked database comprising data concerning IPR messages of said STPs, and
Creating a report representing an analysis of the functionality of said telecommunication network by querying said context-linked database.

Yet another aspect of the present invention is a method for analysis of the status of a telecommunication network comprising STPs, said method comprising:
Creating a context linked database comprising data concerning IPR messages of said STPs, wherein said data comprises status information and alarm information from said STPs, and
Creating a report representing an analysis of the status of said telecommunication network by querying said context-linked database.

A system for monitoring a telecommunication network comprising STPs, said system comprising:
A context-linked database comprising data from IPRs from STPs,
Collection tools arranged to collect said data from said STPs, and
Querying tools arranged to query said context-linked database.

Such a system can further comprise an interface for controlling said system and/or reporting means arranged to make reports based on queries performed in said context-linked database.

Another aspect of the present invention is a computer program comprising program code means arranged to perform all the steps of the methods cited above when said program is run on a computer.

Another aspect of the present invention is a a computer program product comprising program code means stored on a computer readable medium arranged to perform all the steps of any of the methods mentioned above when said program product is run on a computer.

SHORT DESCRIPTION OF THE DRAWINGS

DETAILED DESCRIPTION OF THE INVENTION

Figure 1:
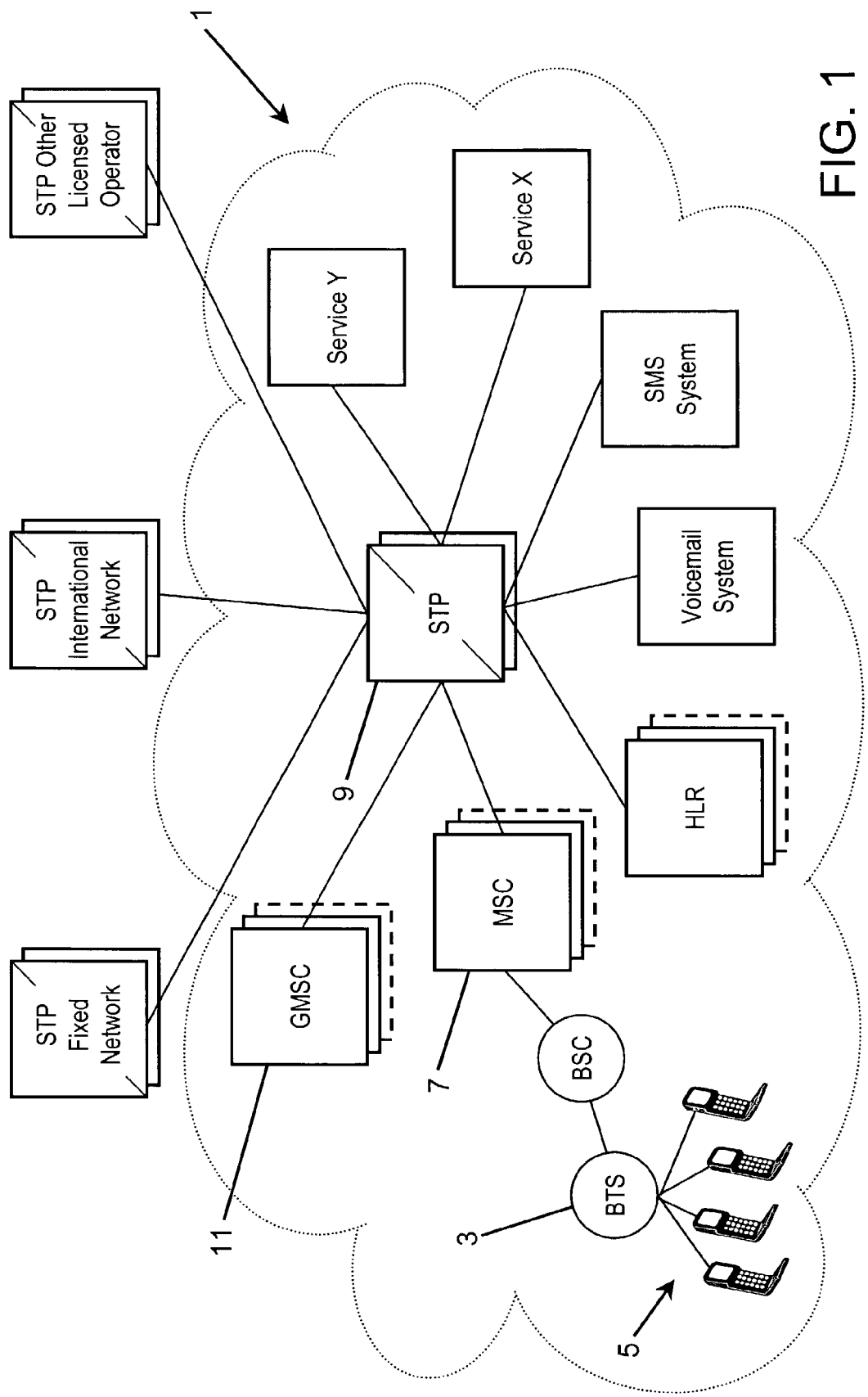
FIG. 1 represents a known SS7 network architecture.

A "signal transfer point" is a packet switch that acts as a routing hub for a signalling network and transfers messages between various points in and among signalling networks. As can be seen in FIG. 1, a signalling network 1 comprises base stations 3 that are in direct contact with the customer's mobile equipment 5. These base stations are interconnected through a network of MSCs 7 and STPs 9. For connecting to other networks, Gateway MSCs 11 are provided.

Figure 2:
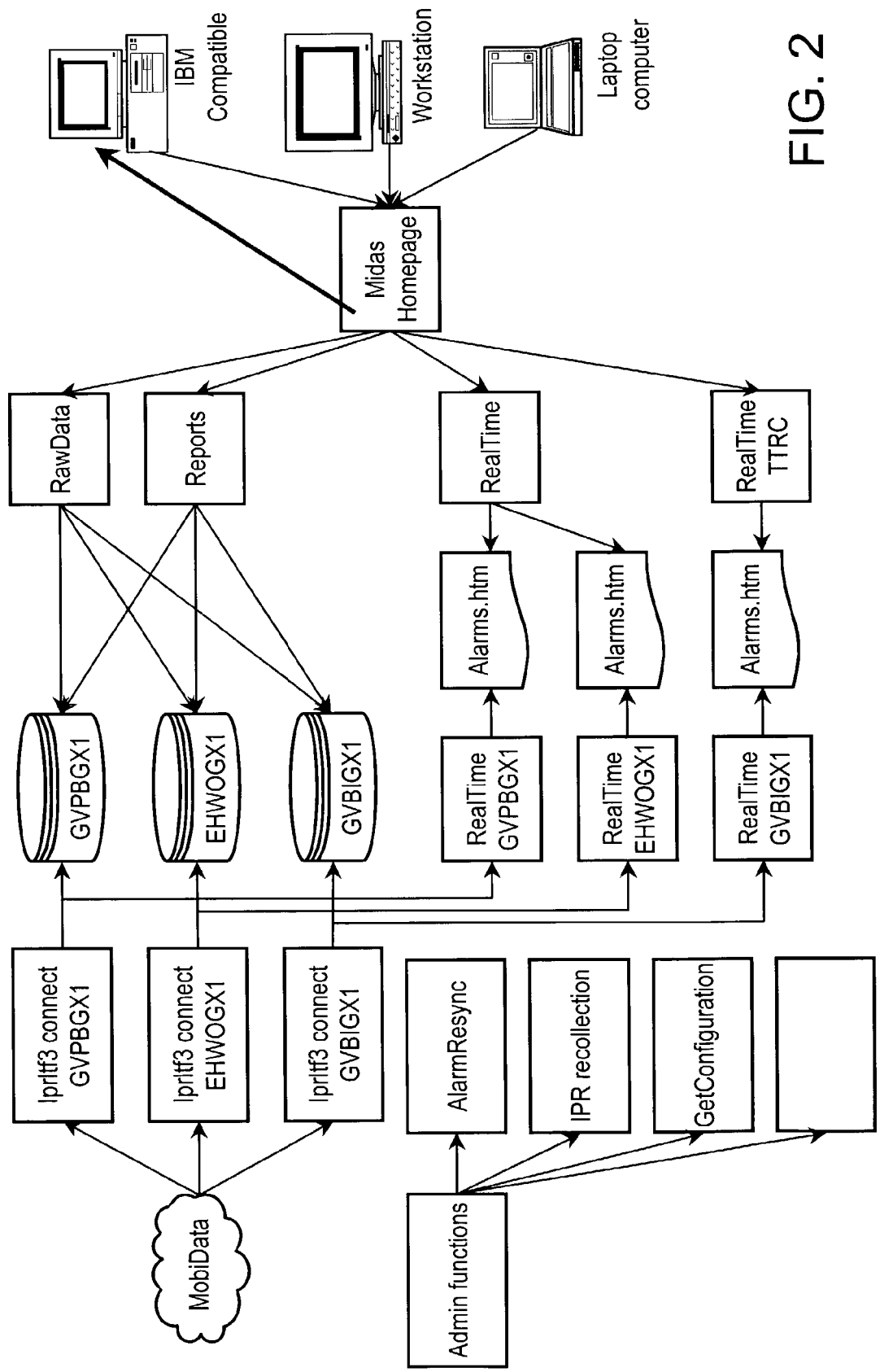
FIG. 2 represents an overview of an embodiment of the present invention.

An overview of a system, designated MIDAS, that operates using the method of the present invention is shown in FIG. 2. From a client interface run on a computer, the systems can be operated. Advantageously, said interface is constructed by using hypertext markup language or e.g. by running Java applets. This has the advantage that the client computer is not restricted by any type, but access to the system can be provided to all TCP/IP compliant systems. The interface, the MIDAS Homepage, is preferably accessible by means of a http server. Also, preferably secured communications are provided to avoid hacking by third parties if the interface is accessible from the Internet.

From the MIDAS Homepage, all necessary functions can be accessed. FIG. 2 shows 4 possible functions, which will be explained later. These functions are usually implemented by scripts such as perl scripts. These scripts are designed to interface with the different components of the system.

Function RawData

The function RawData is responsible for the construction of the context-linked database as described higher. The function will read out the IPR messages of the different STPs, and store them correctly into the context-linked database. An example of a format for such a context-linked database can be seen in table 1:

TABLE 1

Content-linked database fields.

| Field | Content | Meaning |
|---|---|---|
| 1 | Date | Print-date of the IPR |
| 2 | Time | Print-time of the IPR |
| 3 | Priority | Priority (-, *, **, *C) |
| 4 | Category | Category ( COMM, ADMIN, etc) |
| 5 | Ipr | IPR-number |
| 6 | Description | IPR-Description |
| 7 | ReptDate | Report Date of the IPR |
| 8 | ReptTime | Report Time of the IPR |
| 9 | Seq | Sequence counter |
| 10 | Count | Count of this IPR, this period |
| 11 | Level | Alarm lever (MINOR, MAJOR, CATAS) |
| 12 | Alarm | Alarm-number |
| 13 | State | Alarm-state (ON, OFF) |

TABLE 1-continued

Content-linked database fields.

| Field | Content | Meaning |
|---|---|---|
| 14 | Device | Involved device |
| 15 | Frame | Framename |
| 16 | Vert | Vertical position |
| 17 | Hor | Horizontal position |
| 18 | RepProc | Reporting Processor |
| 19 | Prog | Program |
| 20 | Task | Task-number |
| 21 | D1 | Data-field 1 |
| 22 | D2 | Data-field 2 |
| 23 | D3 | Data-field 3 |
| 24 | D4 | Data-field 4 |
| 25 | D5 | Data-field 5 |
| 26 | D6 | Data-field 6 |
| 27 | D7 | Data-field 7 |
| 28 | D8 | Data-field 8 |

Such databases can be created for every STP that is part of the network.

Function on Reports:

The Reports function can be used to analyse either one STP or the network by querying the database(s) created by the RawData function. On the basis of these Report functions, one can quickly identify problems, or do a long-term analysis of network stability.

Functions RealTime and RealTime TTRC

The RealTime and RealTime TTRC Functions can be separate functions or can be integrated in one single script. RealTime is used for maintaining a current status of all alarms in the STP. On receipt of an IPR from an STP, the systems will check whether it is a real alarm. A new alarm will be signalled to the control personnel on-screen, e.g. by applying a colour code (Green-Orange-Red) to indicate urgency of the alarm. If the IPR contains a clearing of an existing alarm, said alarm is removed from the Realtime alarms screen.

In case of a system failure, the status of the alarms can be easily verified by performing a resync of the monitor screen interface. Such a resync can be preferably done at least every 15 minutes, so that the status of the alarms is practically always the real current status. Missed alarms or missed clearing can be easily recovered this way in a systematic way. A resync of a typical system will take about 30 seconds, in contradistinction with the systems of the state of the art which sometimes require 24 hours for reconstructing the status of the STPs.

Admin Functions:

The Admin or Administration functions can be used to verify operation of the system. For example, one can check the status of different scripts (check whether interfaces are being used) and of processes such as IPR-resync and alarm-resync processes. Also, one can check the continuity and completeness of the databases. This is an important feature, as it allows to identify missing IPRs (based on IPR numbers) which can afterwards be retrieved from the STP if necessary. As one knows which IPR is missing, these messages can be easily identified and extracted from the STP's memory. Further, the Admin functions create log files which can be used for debugging purposes.

The invention claimed is:

1. A method for analyzing the functions of a signal transfer point, further referred to as STP, in a telecommunications network, said method comprising the steps of:

collecting Information Problem Report (IPR) messages, further referred to as IPR messages, from said signal transfer point, and wherein said method further comprises the steps of;

selecting data from at least one of said IPR messages regarding a function of said STP, and storing at least part of said data selected from said IPR message in a context-linked database in a place specific to said selected data.

2. The method as in claim 1, wherein said method further comprises creating a report based on data present in said IPR messages by querying said context-linked database.

3. The method as in claim 1, wherein said collecting of the IPR messages is performed at a regular interval.

4. The method as in claim 1, further comprising validation of said IPR messages before storage in the context-linked database, only validated IPR messages being stored.

5. The method as in claim 1, wherein storage in the said context-linked database comprises the following steps:

selecting data from an IPR message regarding the functioning of the signal transfer point, and storing said data in the context-linked database in an appropriate place.

6. The method as in claim 1, wherein said report comprises all the alarm messages by the signal transfer point.

7. A method for long-term analysis of the functioning of a Signal Transfer Point, further referred to as STP, in a telecommunication network, said method comprising:

collecting Information Problem Report messages, further referred to as IPR messages, from said signal transfer point, and wherein said method further comprises the steps of:

selecting data from an IPR message regarding the functioning of said STP, storing at least part of said data selected from said IPR message in a context-linked database in a place specific to said selected data, creating a context-linked database comprising raw data from a Information Problem Report (IPR) messages of said STPs, the raw data being organized within the context-linked database based on the content of the raw data, and creating a report representing an analysis of the functionality of said telecommunication network by querying said context-linked database.

8. A method for analysis of the status of a telecommunication network comprising Signal Transger Points (STPs), said method comprising:

collecting Information Problem Report messages, further referred to as IPR messages. from said STPs;

selecting a part of said data selected from said IPR message in a context-linked database in a location specific to said selected data;

creating a context-linked database comprising data concerning IPR messages of said STPs, wherein said data comprises status information and alarm information from said STPs, and wherein said data includes only portions of the IPR messages that are significant, and creating a report representing an analysis of the status of said telecommunication network by querying said context-linked database.

9. A system for monitoring a telecommunication network comprising STPs, comprising collection means arranged to collect said data from said STP's wherein said system further comprises:

a selection means for selecting data from IPRs from STPs;

a context-linked database for storing selected data, and querying means arranged to query said context-linked database.

10. A system as in claim 9, further comprising an interface for controlling said system.

11. A system as in claim 9, further comprising reporting means arranged to make reports base don queries performed in said context-linked database.

12. A computer readable media comprising program code means arranged to perform the steps of claim 1 when said program is run on a computer.

13. A computer readable media comprising program code means arranged to perform the steps of claim 7 when said program is run on a computer.

14. A computer readable media comprising program code means arranged to perform the steps of claim 8 when said program is run on a computer.

15. A computer readable media product comprising program code means arranged to perform the steps of claim 7 when said program product is run on a computer.

16. A computer program product comprising program code means stored on a computer readable medium arranged to perform the steps of claim 8 when said program product is run on a computer.

* * * * *